United States Patent [19]

Allen

[11] Patent Number: 5,902,862
[45] Date of Patent: May 11, 1999

[54] HIGHLY BRANCHED POLYAMIDOAMINES AND THEIR PREPARATION

[75] Inventor: Anthony J. Allen, Wilmington, Del.

[73] Assignee: Hercules Incorporated, Wilmington, Del.

[21] Appl. No.: 09/017,857

[22] Filed: Feb. 3, 1998

Related U.S. Application Data

[62] Division of application No. 08/634,226, Apr. 18, 1996, Pat. No. 5,786,429.

[51] Int. Cl.$^6$ .............................. C08L 71/00; C08L 71/06
[52] U.S. Cl. .......................... 525/430; 525/435; 525/436
[58] Field of Search ................................... 525/430, 435, 525/436

[56] References Cited

U.S. PATENT DOCUMENTS

| | | |
|---|---|---|
| 2,926,116 | 2/1960 | Keim . |
| 2,926,154 | 2/1960 | Keim . |
| 3,332,901 | 7/1967 | Keim . |
| 3,793,279 | 2/1974 | Lipowski . |
| 3,992,251 | 11/1976 | Lipowski . |
| 4,287,110 | 9/1981 | Takagishi et al. . |
| 4,501,640 | 2/1985 | Soerens . |
| 4,528,316 | 7/1985 | Soerens . |
| 4,975,499 | 12/1990 | Bachem et al. . |
| 5,019,606 | 5/1991 | Marten et al. . |
| 5,338,807 | 8/1994 | Espy et al. . |
| 5,510,004 | 4/1996 | Allen . |
| 5,641,855 | 6/1997 | Scherr et al. . |

FOREIGN PATENT DOCUMENTS

| | | |
|---|---|---|
| 0979579 | 12/1975 | Canada . |
| 92060488 | 9/1992 | Japan . |
| 9414873 | 7/1994 | WIPO . |

OTHER PUBLICATIONS

Flory, Paul J., *Principles of Polymer Chemistry*, Cornell University Press, Ithaca, New York (1953), pp. 91–95, 308–314, and 576–589.

Espy, Herbert H., "Chapter 2—Alkaline–Curing Polymeric Amine–Epichlorohydrin Resins", *Wet Strength Resins and Their Applications*, L.L. Chan (Ed.), TAPPI Press, Atlanta GA (1994), pp. 14–44.

Dagani, Don, "Chemists Explore Potential of Dendritic Macromolecules as Functional Materials", *Chemical & Engineering News–C&EN*, vol. 74, No. 23, Jun. 3, 1996, pp. 30–38.

Roovers, Jacques, "Branched Polymers", *Encyclopedia of Polymer Science and Engineering*, John Wiley & Sons (1985), vol. 2, pp. 478–499.

*Primary Examiner*—Helen L. Pezzuto
*Attorney, Agent, or Firm*—Greenblum & Bernstein, P.L.C.

[57] ABSTRACT

An intralinked polyamidoamine which is nonthermosetting and endcapped. This intralinked polyamidoamine is the reaction product of a dicarboxylic acid or dicarboxylic acid derivative, a polyamine, an endcapping agent, and an intralinker.

20 Claims, 4 Drawing Sheets

Idealized structure of product resin

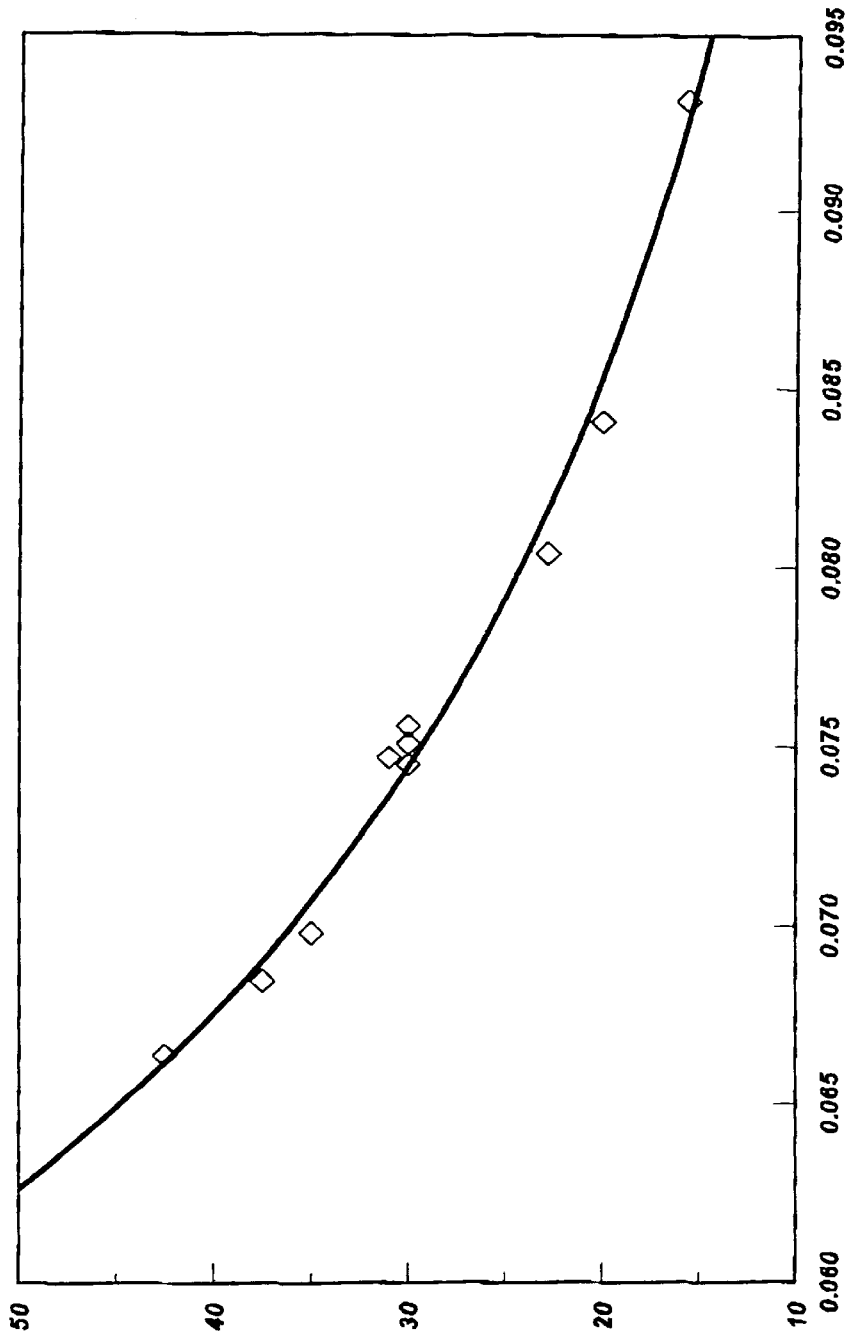

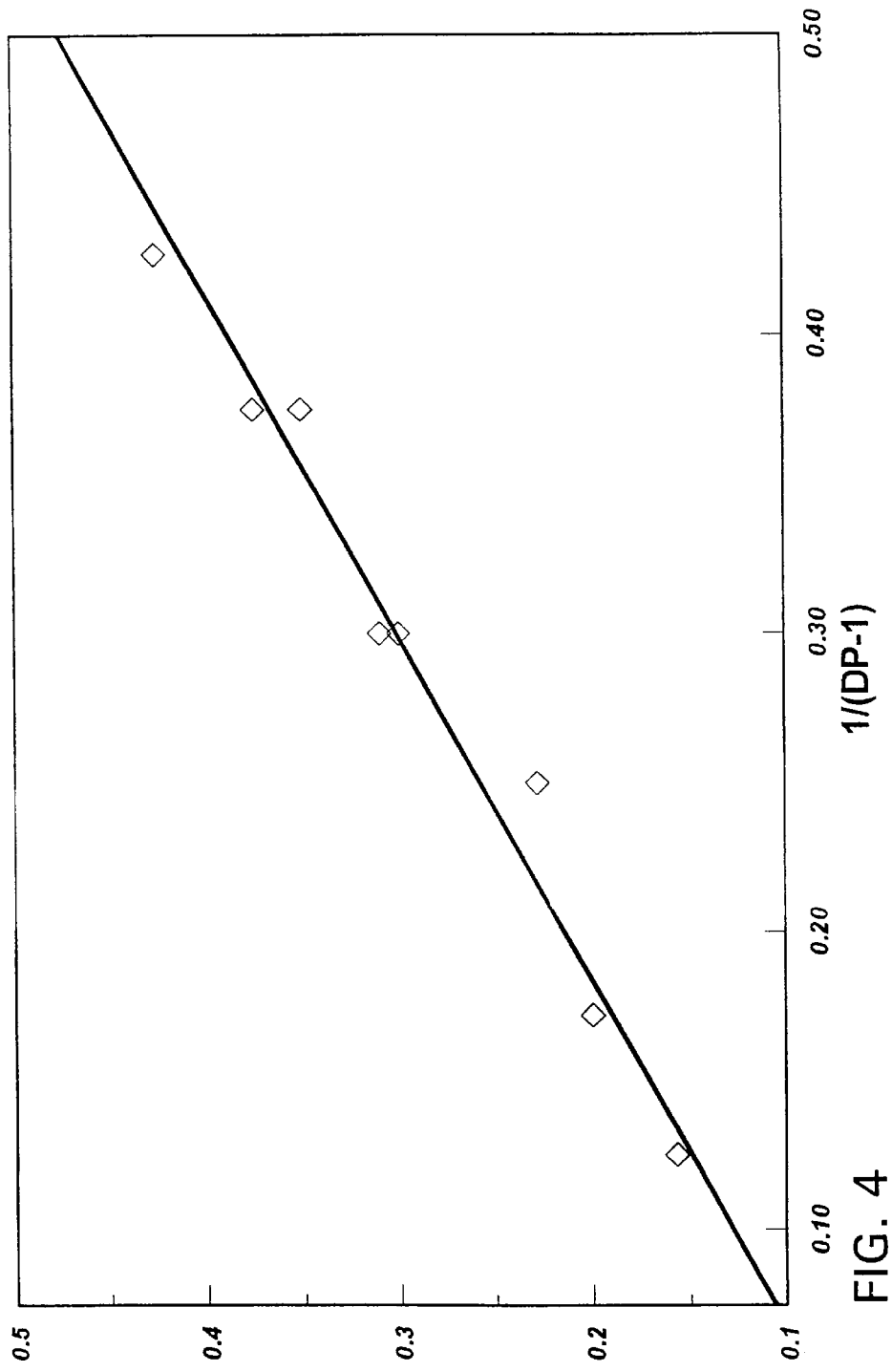

3,902,862

HIGHLY BRANCHED POLYAMIDOAMINES AND THEIR PREPARATION

CROSS REFERENCE TO RELATED APPLICATION

This application is a divisional of application Ser. No. 08/634,226, filed Apr. 18, 1996, now U.S. Pat. No. 5,786,429.

BACKGROUND OF THE INVENTION

1. Field of the Invention

The present invention relates to highly branched polyamidoamines, and to the preparation of highly branched polyamidoamines.

2. Description of Background and Other Information

Polyamidoamine-epichlorohydrin resins have been used extensively as wet strength agents for paper, and for other applications. These resins are typically prepared in a two step process.

In the first step, a polyamidoamine prepolymer is prepared from a diacid (e.g. adipic acid) and a polyamine (e.g., diethylenetriamine). Then in the second step, the prepolymer is reacted with epichlorohydrin in an amount equal to or greater than the amount of secondary amine groups in the prepolymer.

In the latter step, a small amount of the epichlorohydrin reacts to effect branching of the polymer, accompanied by an increase in molecular weight. However, the majority of the epichlorohydrin reacts with the prepolymer to give reactive functional groups—specifically, either aminochlorohydrin or azetidinium.

These wet strength resins can also be used as creping adhesives. Creping adhesives can also be prepared using lower levels of epichlorohydrin, resulting in lower levels of reactive functionality.

SUMMARY OF THE INVENTION

The intralinked polyamidoamine of the present invention is preferably characterized by a highly branched structure that lacks the reactive intralinker functionality of the wet strength and creping adhesive resins in the prior art. This highly branched structure results from reacting a prepolymer of controlled molecular weight—especially, a prepolymer of predetermined low molecular weight—with the requisite amount of epichlorohydrin or other intralinking agent.

Further, the intralinked polyamidoamine of the present invention is a preferably a nonthermosetting and endcapped intralinked polyamidoamine. Also as a matter of preference, the intralinked polyamidoamine of the invention is free or substantially free of reactive intralinker functionality.

The intralinked polyamidoamine of the invention preferably comprises the reaction product of reactants which include at least one dicarboxylic acid or dicarboxylic acid derivative, at least one polyamine, at least one endcapping agent, and at least one intralinker. The at least one endcapping agent preferably comprises at least one member selected from the group consisting of monofunctional amines, monofunctional carboxylic acids, and monofunctional carboxylic acid esters.

Further, the intralinked polyamidoamine of the invention preferably comprises the reaction product of an endcapped polyamidoamine prepolymer and the at least one intralinker. The endcapped polyamidoamine prepolymer itself preferably comprises the reaction product of the at least one dicarboxylic acid or dicarboxylic acid derivative, the at least one polyamine, and the at least one endcapping agent.

Also as a matter of preference, the endcapped polyamidoamine prepolymer is free or substantially free of amine and carboxyl end groups. Additionally, the endcapped polyamidoamine prepolymer preferably comprises alternating dicarboxylic acid and polyamine residues, and endcaps lacking carboxyl and amine functionality; yet further, the endcaps are preferably amide endcaps.

The endcapped polyamidoamine prepolymer preferably has a $DP_n$ of about 2 to about 50—more preferably about 3 to about 25, and still more preferably about 3 to about 10. Also as a matter of preference, the mole ratio of the at least one intralinker, to intralinker reactive amine groups in the endcapped polyamidoamine prepolymer, is between about $\frac{1}{2}[1/(DP_n-1)]$ and about $1/(DP_n-1)$.

The invention also pertains to a process for preparing an intralinked polyamidoamine polymer which is nonthermosetting and endcapped. This process comprises reacting at least one dicarboxylic acid or dicarboxylic acid derivative, at least one polyamine, at least one endcapping agent, and at least one intralinker.

BRIEF DESCRIPTION OF THE DRAWINGS

FIG. 3 is a graph plotting maximum amount of intralinker against prepolymer reduced specific viscosity.

FIG. 4 is a graph showing the relationship between maximum amount of intralinker and $1/(DP_n-1)$ for resins of the invention.

DESCRIPTION OF THE INVENTION

Figure 1:
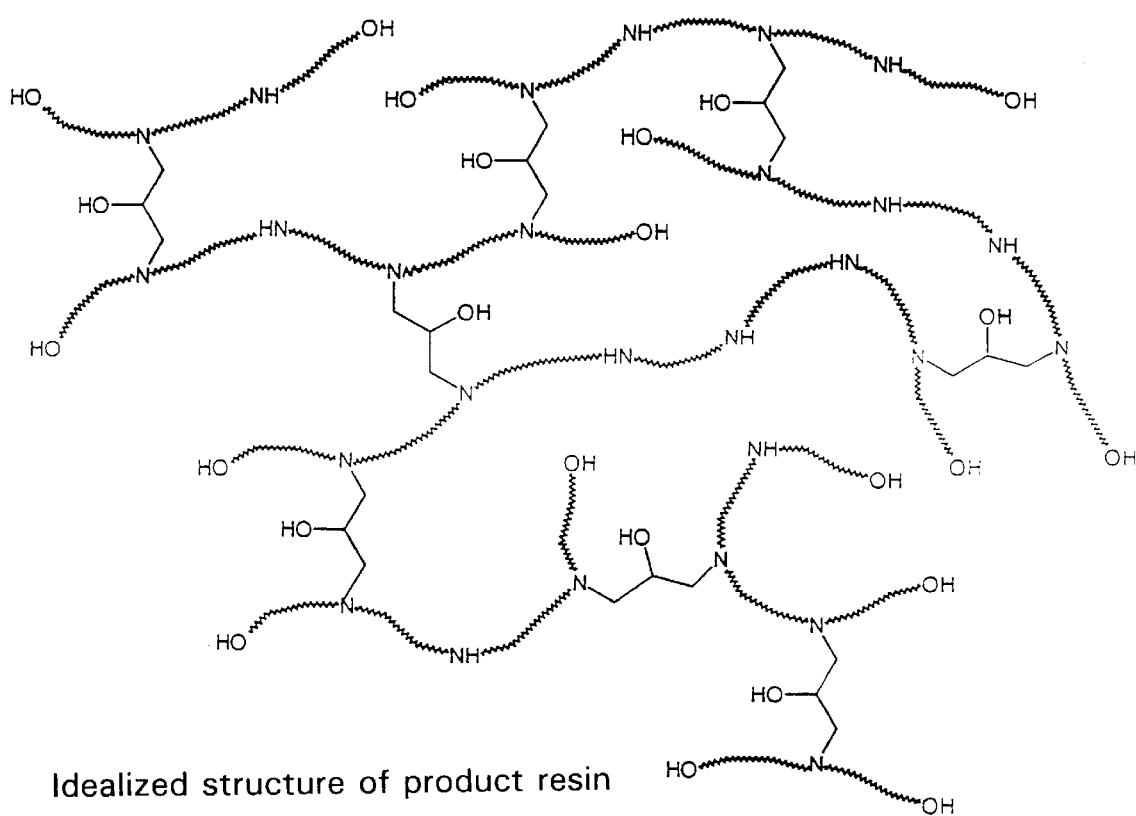
FIG. 1 is an idealized representation of the structure characterizing the intralinked polyamidoamine of the invention —prepared from dicarboxylic acid or dicarboxylic acid derivative, polyalkylene polyamine, monoalkanol amine, and epihalohydrin.

The dicarboxylic acids and dicarboxylic acid derivatives of the invention comprise two amidization reactive carboxyl (i.e., —COOH) groups.

Suitable dicarboxylic acids for the invention include the $C_2-C_{12}$ dicarboxylic acids. Particular dicarboxylic acids which are suitable include oxalic, malonic, succinic, glutaric, adipic, pilemic, suberic, azelaic, sebacic, maleic, fumaric, itaconic, phthalic, isophthalic, and terephthalic acids.

Suitable dicarboxylic acid derivatives for the invention include dicarboxylic acid esters and dicarboxylic acid halides. Preferred derivatives are the esters.

Dicarboxylic acid esters which may be used include esters of the $C_2-C_{12}$ dicarboxylic acids, and especially the $C_1-C_3$ diesters of these acids. Particular diesters which are suitable include dimethyl adipate, dimethyl malonate, diethyl malonate, dimethyl succinate, and dimethyl glutarate.

Appropriate dicarboxylic acid halides include adipoyl chloride, glutaryl chloride, and sebacoyl chloride.

The polyamines of the invention comprise at least two amidization reactive amine groups. Preferably the amidization reactive amine groups are primary amine groups.

Also as a matter of preference, the polyamines of the invention further comprise at least one intralinker reactive amine group. The intralinker reactive amine groups are preferably secondary and/or tertiary amine groups.

Suitable polyamines include the polyalkylene polyamines—including those having at least two primary amine groups and also at least one secondary and/or at least one tertiary amine group. Especially preferred polyamines, including the polyalkylene polyamines, are those having two primary amine groups and also at least one secondary and/or at least one tertiary amine group. Particular suitable polyamines include diethylenetriamine (DETA), triethylenetetramine (TETA), tetraethylenepentamine (TEPA), iminobispropylamine (IBPA), N-methyl-bis-(aminopropyl)amine (MBAPA), and bis-hexamethylenetriamine.

Endcapping agents are understood as including whatever attaches to or reacts with the dicarboxylic acid, dicarboxylic acid derivative, or polyamine—or attaches to or reacts with dicarboxylic acid or polyamine residues—and thereby prevents the further reaction of these reactants and residues. Particularly, it is further amidization reactions of these reactants and residues which are thusly prevented.

Suitable endcapping agents for the invention include the monofunctional amines, the monofunctional carboxylic acids, and the monofunctional carboxylic acid esters. It is understood that the monofunctional amines are those amines having only one amidization reactive amine group, that the monofunctional carboxylic acids are those carboxylic acids having only one amidization reactive carboxyl group, and that the monofunctional carboxylic acid esters are those carboxylic acid esters having only one amidization reactive ester group.

Suitable monofunctional amines include monofunctional primary amines, including monoalkyl amines and monoalkanol amines, and monofunctional secondary amines, including dialkyl amines and dialkanol amines.

Among the monofunctional primary amines which are suitable are butylamine, ethanolamine (i.e., monoethanolamine, or MEA), cyclohexylamine, 2-methylcyclohexylamine, 3-methylcyclohexylamine, 4-methylcyclohexylamine, benzylamine, isopropanolamine (i.e., monoisopropanolamine), mono-sec-butanolamine, 2-amino-2-methyl-1-propanol, tris(hydroxymethyl) aminomethane, tetrahydrofurfurylamine, furfurylamine, 3-amino-1,2-propanediol, 1-amino-1-deoxy-D-sorbitol, and 2-amino-2-ethyl-1,3-propanediol. Among the monofunctional secondary amines which are suitable are diethylamine, dibutylamine, diethanolamine (i.e., DEA), di-n-propylamine, diisopropanolamine, di-sec-butanolamine, and N-methylbenzylamine.

Monofunctional carboxylic acids which are suitable for the present invention include benzoic acid, 2-hydroxybenzoic acid (i.e., salicylic acid), 3-hydroxybenzoic acid, acetic acid, phenylacetic acid, propionic acid, butyric acid, valeric acid, caproic acid, caprylic acid, oleic acid, ortho-toluic acid, meta-toluic acid, and para-toluic acid, ortho-methoxybenzoic acid, meta-methoxybenzoic acid, and para-methoxybenzoic acid.

Monofunctional carboxylic acid esters which are suitable for the present invention include methyl acetate, ethyl acetate, methyl benzoate, ethyl benzoate, methyl propionate, ethyl propionate, methyl butyrate, ethyl butyrate, methyl phenyl acetate, and ethyl phenyl acetate.

Intralinkers appropriate for the present invention include compounds having two, or at least two sites which are reactive with intralinker reactive amine groups in the prepolymer of the invention, and which thereby connect prepolymer chains to provide the desired branching. In this context, the intralinker reactive amine groups are understood as including the prepolymer secondary and tertiary amine groups which thusly react with the intralinkers.

These intralinkers accordingly link the prepolymer to provide the high molecular weight, highly branched, intralinked polymers or resins—preferably, the high molecular weight, highly branched, intralinked polyamidoamine polymers or resins—of the invention. In this regard, the intralinking which characterizes the intralinked polymers of the invention is the intramolecular connection of prepolymer chains by intralinker; this intralinking does not encompass intermolecular connections between discrete polymer molecules.

The intralinking of the present invention is accordingly distinguished from crosslinking, which is understood as referring to the indicated intermolecular connections. In resins of the prior art, compounds which serve as intralinkers for the present invention can serve to crosslink polymer molecules; this crosslinking is absent, or substantially or essentially absent, from the intralinked polyamidoamines of the invention.

Suitable intralinkers include haloalklyene oxides. These include epihalohydrins—i.e., epichlorohydrin, epibromohydrin, epiiodohydrin, and epifluorohydrin—and alkyl substituted epihalohydrins. Also included are 1-bromo-3,4-epoxybutane, chloroepoxyhexane, and iodoepoxyisobutane. Diepoxides, including ethylene glycol diglycidyl ether (i.e., EGDGE) and 1,4-butanediol diglycidyl ether (i.e., BDDGE), are also suitable. 1,2,7,8-diepoxyoctane, 3-(bis (glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol. A diglycidyl ether may also be used.

Yet additional suitable intralinkers are diacrylates dimethacrylates, diacrylamides, and dimethacrylamides which are reactive, with the intralinker reactive amine groups of the prepolymer, by a Michael reaction. Examples are ethylene glycol diacrylate, ethylene glycol dimethacrylate, 1,4-butanediol diacrylate, 1,4-butanediol dimethacrylate, tripropylene glycol diacrylate, tripropylene glycol dimethacrylate, triethylene glycol diacrylate, triethylene glycol dimethacrylate, 1,6-hexanediol diacrylate, 1,6-hexanediol dimethacrylate, N,N'-methylenebisacrylamide, N,N'-methylenebismethacrylamide, N,N'-(1,2-dihydroxyethylene)bisacrylamide, and N,N'-(1,2-dihydroxyethylene)bismethacrylamide.

The prepolymer of the invention is a preferably a controlled, low molecular weight prepolymer. The prepolymer of the invention is also preferably an endcapped prepolymer. Yet further as a matter of preference, the prepolymer of the invention is a polyamidoamine. The polyamidoamine prepolymer of the invention is preferably obtained by a polycondensation reaction of the dicarboxylic acid, polyamine, and endcapping agent.

The diacid, polyamine, and endcapping agent undergo amidization—i.e., carboxyl groups and amine groups of these reactants react to form amide functionalities. In this context, amidization reactions are understood as including condensation reactions of the diacid and polyamine—particularly, reaction of diacid carboxyl groups with polyamine primary amine groups—in formation of prepolymer chains. Amidization reactions are also understood as including reactions of endcapping agents with prepolymer chain end groups—particularly, reaction of monofunctional carboxylic acid carboxyl groups with prepolymer primary amine groups, and reaction of the amine groups of monofunctional amines with prepolymer carboxyl groups—to form endcapped prepolymer.

Further in this context, amidization reactive groups are understood as including the carboxyl and amine groups of the diacids, polyamines, and endcapping agents which undergo the amidization reactions. Particularly as to the polyamines, the amidization reactive groups are understood as including the primary amine groups of the polyamines.

One or more of each of the acid, polyamine, and endcapping agent may be employed in the polycondensation; further, one or more dicarboxylic acid derivatives may be used in place of, or in addition to, the dicarboxylic acid. Particularly as to endcapping agent, one or more monofunctional amines and/or one or more monofunctional carboxylic acids may be used.

The volatility of the endcapping agent should be low enough so that this agent remains in the prepolymerization reaction at the temperature at which the reaction is being conducted. Particularly, when the prepolymer is prepared by thermally driven polycondensation, volatility is a significant feature of the endcapping agent; in this instance, an endcapping agent of lesser volatility is preferred. The boiling point of the endcapping agent should be high enough so that, at the temperature being employed to drive off the condensation product—i.e., water where a diacid reactant is used, and alcohol in the case of diester—the agent is not also removed.

Considering the foregoing, for diacids—particularly where the diacid and polyamine are adipic acid and DETA—prepolymerization will customarily be conducted at about 150°–180° C.—more preferably, about 160°–170° C. In this instance the endcapping agent should therefore have a boiling point above 180° C.—or above 170° C., in the case of the indicated 160°–170° C. range—so that it is not driven off with the water.

Where diester is used instead of diacid, and the resulting alcohol condensation product is more volatile than water, an endcapping agent of greater volatility may be used. Because not as high a temperature is required for removing the alcohol, the endcapping agent can correspondingly have a lower boiling point without being taken off.

The polycondensation reaction of dicarboxylic acid and/or derivative, polyamine, and endcapping agent thusly provides a prepolymer comprising polymer chains which include alternating dicarboxylic and polyamine residues, and which are terminated by endcaps. It is understood that the dicarboxylic and polyamine residues are the units remaining after the amidization reactions of dicarboxylic acid and/or derivative with polyamine to form the prepolymer chains, and that the endcaps also are residues—i.e., the units remaining after reaction of endcapping agent with prepolymer chain end groups.

By virtue of the presence of the endcapping agent in the prepolymerization polycondensation reaction of the invention, the prepolymer is thusly endcapped. Amine and carboxyl functionality are therefore preferably absent, or at least essentially absent or at least substantially absent, from the chain ends of the endcapped prepolymer—i.e., the endcapped prepolymer is free, or at least essentially or at least substantially free, of amine and carboxyl end groups.

Accordingly, the prepolymer of the invention is preferably characterized by endcaps lacking both carboxylic and amine functionality. The monofunctional amine endcapping agents react with carboxyl groups of the forming prepolymer, while monofunctional carboxylic acid endcapping agents react with prepolymer amidization reactive amine groups; in both instances, the result is an amide endcap. The endcaps of the prepolymer are therefore preferably amide endcaps.

It is understood that the polyamidoamine prepolymers or intralinked polyamidoamines are "endcapped" when they comprise an endcap, as discussed herein. Particularly, they are endcapped when they comprise a residue (reaction product) of an endcapping agent.

The molecular weight of the prepolymer of the invention can be controlled by the relative amounts of the dicarboxylic acid, polyamine, and endcapping agent employed in the polycondensation reaction. Particularly, it is the use of endcapping agent which allows for control of the prepolymer molecular weight.

In this regard, where the endcapping agent is a monofunctional carboxylic acid, during prepolymerization it is competing with the dicarboxylic acid to react with the polyamine, and with amine end groups in the growing prepolymer chain. If it is the diacid which reacts, polymerization continues; however, amidization with the endcapping agent forms an endcap, thusly stopping the chain growth. Conversely, if a monofunctional amine is the endcapping agent, competition is with the polyamine reactant.

The more endcapping agent which is employed relative to its competing reactant, the lower will be the molecular weight of the resulting prepolymer. Particularly, the more one of the diacid end polyamine reactants is replaced by its competing endcapping agent, the lower the prepolymer molecular weight will be. In this manner, a prepolymer of predetermined molecular weight can be provided.

The relative proportions of diacid, polyamine, and endcapping agent employed in the prepolymerization reaction are preferably such that the total number of amidization reactive carboxyl groups contributed by these reactants is equal, or at least substantially equal or essentially equal, to the total number of amidization reactive amine groups which are contributed; accordingly, the ratio of the total number of these amidization reactive carboxyl groups to the total number of amidization reactive amine groups is preferably 1:1, or about 1:1. This correspondence between amidization reactive carboxyl and amine groups is necessary so that endcapping of the prepolymer will likewise be complete, or at least substantially complete or essentially complete.

Therefore, where the endcapping agent is a monofunctional carboxylic acid, the relative proportions of diacid, polyamine, and endcapping agent will be such that the total number of amidization reactive carboxyl groups contributed by the diacid and the endcapping agent together will be equal, or at least substantially equal or essentially equal, to the number of amidization reactive amine groups contributed by the polyamine. And where the endcapping agent is a monofunctional amine, the relative proportions of diacid, polyamine, and endcapping agent will be such that the total number of amidization reactive amine groups contributed by the polyamine and the endcapping agent together will be equal, or at least substantially equal or essentially equal, to the number of amidization reactive carboxyl groups contributed by the diacid.

Specifically, taking a 1:1 molar ratio of diacid and polyamine as the starting point, preferably two moles, or about two moles, of the endcapping agent are employed in place of one mole of whichever of the diacid and polyamine is its competing reactant. Accordingly, if the endcapping agent is a monofunctional carboxylic acid, it should be considered that two moles, or about two moles, of this acid is replacing each mole of the diacid in a 1:1 molar ratio of diacid and polyamine. Conversely, if the endcapping agent is a monofunctional amine, it should be considered that two moles, or about two moles, of this amine is replacing each mole of the polyamine in the indicated 1:1 diacid/polyamine molar ratio.

The molecular weight of the prepolymer of the invention can be measured by the reduced specific viscosity (RSV). Prepolymer molecular weight can also be expressed in terms of $DP_n$, which is the number-average degree of polymerization, or the average number of subunits in a polymer chain. Particularly for the endcapped prepolymer of the present invention, the subunits include the following:

- the amidoamine subunits, each of these units being a single diacid residue linked to a single polyamine residue; and
- taken as one subunit, the two endcaps and the single excess residue which remains after apportioning the other diacid and polyamine residues into amidoamine subunits.

The $DP_n$ of the prepolymer of the invention is additionally defined by the formula $$DP_n = (1+r)/(1-r)$$

where r is defined as the ratio of the monomer units, and is itself calculated as follows:

where A>B, $r = A/(B+2C)$ where B>A, $r = B/(A+2C)$

The quantity r is always less than 1.

A, B, and C represent the molar proportions of diacid, polyamine, and endcapping agent, respectively. These quantities are further defined by the following relationships:

where A>B, $C = 2(A-B)$ where B>A, $C = 2(B-A)$

Where A is greater than B, C is monofunctional amine; where B is greater than A, C is monofunctional carboxylic acid. A and B are never equal.

The prepolymer of the invention has a $DP_n$ preferably of about 2 to about 50, more preferably of about 3 to about 25. As a matter of particular preference, the $DP_n$ of the prepolymer of the invention is about 3 to 10.

Where $DP_n = 2$, $r = \frac{1}{3}$ (0.333). Where $DP_n = 50$, $r = 49/51$ (0.961). Table 1 below shows the different values of r, A, B, and C for $DP_n$ equal to 2 and $DP_n$ equal to 50—depending upon whether there is a molar excess of diacid to polyamine (i.e., A>B), with the endcapping agent therefore being monofunctional amine, or a molar excess of polyamine to diacid (i.e., B>A), with the endcapping agent therefore being monofunctional acid.

TABLE 1

|  | $DP_n$ | r | A | B | C |
|---|---|---|---|---|---|
| Monofunctional amine; A > B | 50 | 0.961 | 1.000 | 0.986 | 0.028 |
| Monofunctional amine; A > B | 2 | 0.333 | 1.000 | 0.333 | 1.334 |
| Monofunctional acid; B > A | 50 | 0.961 | 0.986 | 1.000 | 0.028 |
| Monofunctional acid; B > A | 2 | 0.333 | 0.333 | 1.000 | 1.334 |

The amine functionality-free and carboxyl functionality-free endcaps for the prepolymer are preferred to provide the desired high molecular weight, highly branched (i.e., hyperbranched) polymers—preferably, high molecular weight, highly branched (i.e., hyperbranched) polyamidoamines—of the invention. Amine functionality in the chain end groups of the completed prepolymer is disadvantageous because amine end groups will react with the intralinker to give chain extension, rather than the desired branching. This chain extension would thusly cause the resin final product to be excessively linear.

Further, carboxyl functionality in the chain end groups of the completed prepolymer also is disadvantageous because carboxyl end groups will react with polymer chain secondary amines. The likely result will be gelling; in any case, the final product would be unsuitable.

It is thusly preferred that control of prepolymer molecular weight be accomplished by endcapping, as discussed herein. If instead of including endcapping agent in the polycondensation reaction, the molecular weight of the prepolymer is controlled by limiting the amount of diacid reactant relative to polyamine (i.e., employing an excess of polyamine in the prepolymerization), then the resulting prepolymer will be characterized by a preponderance of primary amine end groups. Conversely, if prepolymer molecular weight is controlled by limiting the amount of polyamine reactant relative to diacid (i.e., employing an excess of diacid in the prepolymerization), then the resulting prepolymer will be characterized by a preponderance of carboxyl end groups. The disadvantages of amine and carboxyl end groups in the prepolymer are as has been discussed.

Further, where a low molecular weight prepolymer is provided, it is possible to obtain a more highly branched, intralinked final resin product—particularly, a more highly branched, intralinked polyamidoamine resin. specifically, the lower the molecular weight of the prepolymer, the greater the amount of branching can be provided in the final product.

The amount of intralinker used for preparing the intralinked polyamidoamine of the invention is that which is sufficient to provide a high molecular weight, highly branched resin, but which is also low enough so that all, or essentially all or substantially all, of the intralinker is serving to intralink prepolymer, or is fully reacted—i.e., leaving the intralinked resin free, or essentially free or substantially free, of reactive intralinker functionality.

Expressed in terms of prepolymer molecular weight, the intralinker is preferably present, in the intralinked polyamidoamine of the invention, in an amount wherein the mole ratio of intralinker, to intralinker reactive amine groups in the endcapped prepolymer, is between about $\frac{1}{2}[1/(DP_n-1)]$ and about $1/(DP_n-1)$]. More preferably, the intralinker is present in an amount wherein the mole ratio of intralinker, to intralinker reactive amine groups in the endcapped prepolymer, is equal to $1/(DP_n-1)$, or about $1/(DP_n-1)$.

In this regard, the $1/(DP_n-1)$ value, at the upper end of the indicated $\frac{1}{2}[1/(DP_n-1)]$ to $1/(DP_n-1)$] range, is optimal because it represents the highest proportion of intralinker employed with a given prepolymer molecular weight. At a particular prepolymer molecular weight, the more intralinker which may be employed, the greater the degree of the desired branching is achieved.

Also as a matter of preference, the intralinker is preferably present, in the intralinked polyamidoamine of the invention, in an amount wherein the mole ratio of intralinker, to intralinker reactive amine groups in the endcapped prepolymer, is between about 0.02 and about 0.5. Expressed in terms of mole percent, the intralinker is preferably present, in the intralinked polyamidoamine of the invention, in an amount wherein the mole percent of intralinker, based on moles of intralinker reactive amine groups in the endcapped prepolymer, is between about 2 percent and about 50 percent.

More preferably, the intralinker is present in an amount wherein the mole ratio of intralinker, to intralinker reactive amine groups in the endcapped prepolymer, is between about 0.04 and about 0.5—i.e., about 4 to about 50 mole percent intralinker. As a matter of particular preference, the intralinker is present in an amount wherein the mole ratio of intralinker, to intralinker reactive amine groups in the endcapped prepolymer, is between about 0.1 and about 0.5— i.e., about 10 to about 50 mole percent.

It is understood that by moles of intralinker reactive amine groups, it is meant the total number of amine groups in the prepolymer that are reactive with the intralinker.

Reactive intralinker functionality is understood as referring to intralinker which is appended to but is not linking prepolymer, because not all of the intralinker reactive sites have reacted with intralinker reactive amine groups of the prepolymer. For instance, where epichlorohydrin is the intralinker, two possible types of reactive intralinker functionality are azetidinium and aminochlorohydrin groups.

The lower the molecular weight of the prepolymer, the more intralinker is required to achieve the requisite high molecular weight through branching. However, the maximum amount of intralinker which can be employed is that which can be reacted with the prepolymer and still leave the intralinked resin free, or essentially free or substantially free, of reactive intralinker functionality. This maximum amount of intralinker is also that amount which can be reacted with the prepolymer without causing the resin to gel, or without resulting in a thermosetting resin.

In this regard, gelling and thermosetting of polyamidoamine resins result from the presence of reactive intralinker functionality. Both gelling and thermosetting entail the formation of intermolecular connections between discrete resin molecules. Gelling and thermosetting are caused by reaction between reactive intralinker functionality and intralinker reactive amine groups of different resin molecules; the reactive intralinker functionality thusly crosslinks the different molecules, and these molecules accordingly form an interconnected structure which is insoluble.

Particularly in the case of a thermosetting resin, the act of heating and/or drying the resin hardens it, as well as rendering it insoluble. In the prior art, resin solutions are acid stabilized, so that heating will not gel or thermoset the resin.

In contrast, the intralinked polyamidoamines of the present invention are nongelling and nonthermosetting. With all—or essentially all or substantially all—of the intralinker already reacted to link prepolymer, the dearth of reactive intralinker functionality precludes, or at least greatly limits, reaction between the discrete resin molecules. The intralinked polyamidoamines of the invention can accordingly be redissolved after drying and/or heating.

Reactive intralinker functionality can be ascertained by NMR. Particularly, this analytical technique is suitable for confirming the absence, or substantial or essential absence, of this functionality from resins of the invention.

An idealized representation of the structure which characterizes the resin of the invention—where the resin has been prepared from dicarboxylic acid or dicarboxylic acid derivative, polyalkylene polyamine, monoalkanol amine, and epihalohydrin—is shown in FIG. 1. The indicated high branching and lack of reactive intralinker functionality are displayed in this structure; it is understood that FIG. 1 is not intended to be an accurate representation of the complete molecular structure of the resin.

To prepare the prepolymer from diacid, polyamine, and endcapping agent, a mixture of these three reactants is heated at a temperature of about 160°–170° C. for about ½–4 hours, at atmospheric pressure; where a reduced pressure is employed, lower temperatures may be utilized. This polycondensation reaction produces water as a byproduct, which is removed by distillation. At the end of this reaction the resulting product is dissolved in water at a concentration of about 50% by weight total polymer solids.

Where diester is used instead of diacid, the prepolymerization can be conducted at a lower temperature—specifically, about 110° C. at atmospheric pressure. In this case the byproduct will be an alcohol, the type of alcohol depending upon the identity of the diester. For instance, where a dimethyl ester is employed the alcohol byproduct will be methanol, while ethanol will be the byproduct obtained from a diethyl ester.

An aqueous solution of the prepolymer is reacted with intralinker to obtain the intralinked polyamidoamine. The prepolymer and intralinker are mixed with an appropriate amount of dilution water, to provide a reaction solution having a concentration of about 30% by weight total solids (prepolymer+intralinker). This mixture is then maintained at a temperature of about 25°–80° C.—still more preferably about 50°–70° C., and most preferably about 60° C.

The viscosity of the mixture is monitored, using Gardner-Holdt viscosity tubes. The reaction is continued until viscosity reaches a particular value—preferably, "L" on the Gardner-Holdt scale at which point cold dilution water is added to end the reaction. Alternatively, the reaction may be diluted with warm water, with the heating being continued until the viscosity again builds to the "L" level; several such iterations can be performed before the reaction is ended.

The intralinked polyamidoamines of the invention are suitable for treatment of, addition to, and incorporation with cellulosic and fibrous materials, especially cellulosic and fibrous webs, and most especially paper. The intralinked polyamidoamines of the invention have particular utility as creping adhesives, wet strength agents, and dry strength agents for cellulosic and fibrous materials, especially cellulosic and fibrous webs, and most especially paper. They are also useful as retention and drainage aids in papermaking, and can be employed as size promoters, emulsion stabilizers, paper coatings, adhesive formulations, flocculants, demulsifiers, and corrosion inhibitors.

The invention further pertains to compositions—including aqueous compositions—comprising the intralinked polyamidoamines of the invention. Particularly, compositions comprising the intralinked polyamidoamines of the invention are suitable for treatment of, addition to, and incorporation with cellulosic and fibrous materials, especially cellulosic and fibrous webs, and most especially paper. Compositions of the invention—e.g., aqueous solutions of the intralinked polyamidoamines of the invention— preferably comprise amounts of the resin which are effective for the intended use.

Particularly, compositions of the invention, and most particularly aqueous solutions of the intralinked polyamidoanines of the invention, are suitable as creping adhesive, wet strength, and dry strength compositions—e.g., for cellulosic and fibrous materials, especially cellulosic and fibrous webs, and lost especially paper. These compositions comprise amounts of the resin effective for the intended (e.g., creping adhesive or wet strength) function.

Suitable aqueous solutions of the invention include those having concentrations of about 1–60% by weight resin. For creping adhesive, wet strength, and dry strength applications, solution concentrations of about 1–40% by weight resin are preferred; concentrations of about 5–35% are more preferred, while the most preferred concentrations are about 10–30%.

With regard to creping adhesive applications, the presence of chloride ion can lead to corrosion of the Yankee dryer. Accordingly, resins of the invention which are free of chloride ion—e.g., where the intralinker which is employed is a nonchloride, such as in the case of ethylene glycol diglycidyl ether and 1,4-butanediol diglycidyl ether—are especially advantageous as creping adhesives.

Further, the resins of the invention are particularly advantageous for wet strength applications where repulpability is desired. The cellulosic material with which these resins are thusly used, particularly paper, is easily repulped, due to the lack of intralinker reactive functionality which would create covalent bonds.

The invention also pertains to cellulosic and fibrous materials, especially cellulosic and fibrous webs, and most especially paper, comprising the intralinked polyamidoamines of the invention. These materials preferably incorporate amounts of the resin effective for the intended function.

When employed as wet and dry strength agents, the resins of the invention are preferably present in amounts of about 0.1–5% by weight resin, based on the dry weight of the cellulosic material. The quantity of resin present depends upon the degree of wet and/or dry strength desired in the finished product, and on the amour: of resin retained by the cellulosic fibers.

Compositions and resins of the invention can be employed as wet strength agents and creping adhesives according to the standard methods as these are known in the art. Particularly for wet strength applications, the agents are typically added to the pulp furnish any time before the sheet is formed. In the case of creping applications, the compositions and resins of the invention can be employed as creping adhesives in accordance with the procedures set forth in Canadian Patent No. 979,579 and in U.S. application Ser. No.08/428,287, filed Apr. 25, 1995, which are incorporated herein in their entireties, by reference thereto.

In this regard, fibrous webs, particularly paper webs, are conventionally subjected to the creping process in order to give them desirable textural characteristics, such as softness and bulk. The creping process typically involves applying creping adhesive—generally in the form of an aqueous solution or dispersion—to a drying surface for the web; preferably, this surface is the surface of a rotating creping cylinder, such as the apparatus known as a Yankee dryer. The web is then adhered to the indicated surface. It is subsequently dislodged from the surface with a creping device— preferably, a doctor blade. The impact of the web against the creping device ruptures some of the fiber-to-fiber bonds within the web, causing the web to wrinkle or pucker.

The invention accordingly pertains to a process of creping paper. The creping process of the invention can comprise the steps of providing a fibrous web, and creping this web by applying the intralinked polyamidoamine to the web —and/ or by applying the resin to a means for creping the web, and employing this means to crepe the web. Further in this regard, the creping process of the invention can include the steps of applying the intralinked polyanidoamine to a drying surface for fibrous web, providing a fibrous web, pressing the fibrous web against the drying surface to adhere this web to the surface, and dislodging the fibrous web from the drying surface with a creping device to crepe the fibrous web.

The invention additionally pertains to the making of paper by a process which includes addition of the intralinked polyamidoamine to provide wet strength to the paper. This process can include the steps of providing a paper pulp, adding the resin of the invention to the pulp, forming a sheet from the paper pulp after addition of the intralinked polyamidoamine, and drying the sheet to form paper.

Further, the invention pertains to a process of repulping paper. This process can include the steps of providing paper which comprises the intralinked polyamidoamine of the invention, and forming a slurry comprising water and pulp prepared from the indicated paper. The invention further pertains to the process of making paper from pulp prepared according to the foregoing repulping process, and to paper made from this pulp.

The invention is illustrated by the following Procedures and Examples; these are provided for the purpose of representation, and are not to be construed as limiting the scope of the invention. Unless stated otherwise, all percentages, parts, etc. are by weight.

SYNTHESIS OF THE PREPOLYMERS

Example 1 is a polyamidoamine prepared from adipic acid and diethylenetriamine, without the endcapping agent of the present invention; this prepolymer is included for the purpose of comparison with the prepolymers of the invention.

For the prepolymers of Examples 2–15, which are prepolymers of the invention, the polyamine and the monoethanolamine endcapping agent were added to a 2,000 ml. resin kettle fitted with a condenser, Dean-Stark trap, thermocouple, addition funnel, and mechanical stirrer. Stirring of this mixture was then initiated, and the adipic acid was cautiously added during the stirring; the temperature of the reaction mixture was maintained below 125° C. by controlling the rate at which the adipic acid was added.

After the addition of the adipic acid was completed, the temperature was raised to 169°–171° C., and maintained in this range for 4 hours. During this period water of distillation was removed through the Dean-Stark trap.

Hot water (~70° C.) was cautiously added to the product, which was stirred until the prepolymer was dissolved.

Table 2 below sets forth the amounts of reactants employed in preparing the prepolymers of Examples 1–15, as well as the actual and theoretical water of distillation, the amount of hot water added during the synthesis, and the solids content of the product. Table 2 also lists theoretical and actual molecular weight values (provided as $DP_n$ and RSV, respectively) for the resulting prepolymers.

TABLE 2

Synthesis of Prepolymers

| Example Number | Theoretical $DP_n$ | Moles Adipic | Moles Polyamine | Moles MEA | RSV $(dL/g)^1$ | Theo. W. of Dist. | Actual W. of Dist. | Added Hot Water | Solids |
|---|---|---|---|---|---|---|---|---|---|
| 1 | 100 | 3.00 | 3.00 DETA | 0.00 | 0.1436 | 108 mL | 97 mL | 676 mL | 50.0% |
| 2 | 5.00 | 2.00 | 1.77 DETA | 0.46 | 0.0841 | 72 mL | 59.5 mL | 450 mL | 50.3% |
| 3 | 9.00 | 3.00 | 2.75 DETA | 0.50 | 0.0932 | 108 mL | 101 mL | 450 mL | 59.7% |
| 4 | 3.67 | 3.00 | 2.25 DETA | 1.50 | 0.0685 | 108 mL | 91 mL | 650 mL | 49.7% |
| 5 | 3.67 | 3.00 | 2.25 DETA | 1.50 | 0.0698 | 108 mL | 99 mL | 650 mL | 51.6% |
| 6 | 3.34 | 3.00 | 2.14 DETA | 1.71 | 0.0664 | 108 mL | 96 mL | 650 mL | 50.9% |
| 7 | 4.33 | 3.00 | 2.40 DETA | 1.20 | 0.0745 | 108 mL | 96.5 mL | 650 mL | 51.8% |

TABLE 2-continued

Synthesis of Prepolymers

| Example Number | Theoretical $DP_n$ | Moles Adipic | Moles Polyamine | Moles MEA | RSV (dL/g)[1] | Theo. W. of Dist. | Actual W. of Dist. | Added Hot Water | Solids |
|---|---|---|---|---|---|---|---|---|---|
| 8  | 4.33 | 3.00 | 2.40 DETA  | 1.20 | 0.0751 | 108 mL | 100 mL   | 650 mL | 50.7% |
| 9  | 4.33 | 3.00 | 2.40 DETA  | 1.20 | 0.0747 | 108 mL | 105 mL   | 650 mL | 52.5% |
| 10 | 4.33 | 3.00 | 2.40 DETA  | 1.20 | 0.0756 | 108 mL | 100 mL   | 650 mL | 50.5% |
| 11 | 6.80 | 3.00 | 2.66 DETA  | 0.69 | 0.0865 | 108 mL | 102 mL   | 450 mL | 60.4% |
| 12 | 6.00 | 2.00 | 1.60 TEPA  | 0.80 | 0.1207 | 72 mL  | 54.5 mL  | 570 mL | 50.8% |
| 13 | 6.00 | 2.00 | 1.60 TETA  | 0.80 | 0.0959 | 72 mL  | 61 mL    | 570 mL | 48.1% |
| 14 | 6.80 | 2.00 | 1.77 MBAPA | 0.46 | 0.0914 | 72 mL  | 63 mL    | 500 mL | 51.9% |
| 15 | 3.67 | 2.00 | 1.50 MBAPA | 1.00 | 0.0698 | 72 mL  | 61 mL    | 500 mL | 51.6% |

[1]Measured at 25° C. in 1.0 M $NH_4Cl$ at a concentration of 2.00 g/dL.

Figure 2:
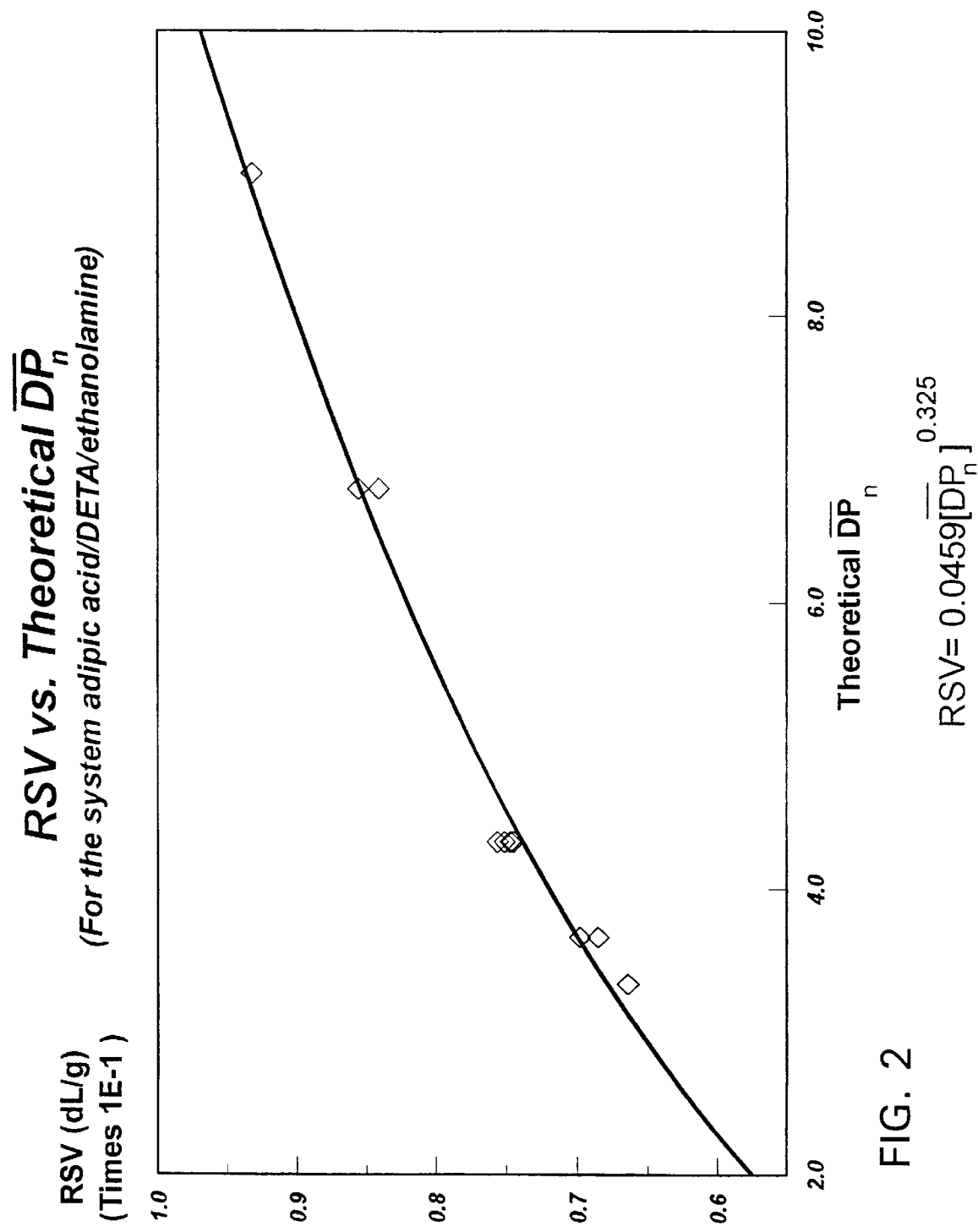
FIG. 2 is a graph showing the relationship between actual reduced specific viscosity, for prepolymer of the invention, and the prepolymer theoretical $DP_n$.

FIG. 2 shows the variation between theoretical and actual molecular weight for prepolymers of the invention. The theoretical molecular weight is set forth as $DP_n$; the actual molecular weight is stated as reduced specific viscosity, measured as deciliters per gram (dL/g) at 25° C. in 1.0 M $NH_4Cl$ at a concentration of 2.00 g/dL.

The points plotted in the graph are based on the data from Examples 2–11, and the curve is created from these points. As this curve demonstrates, there is a good correlation between actual molecular weight, measured as reduced specific viscosity, and theoretical molecular weight, measured as $DP_n$.

Particularly, this correlation can be expressed by the following formula:

$$RSV = a[DP_n]^b$$

The values of a and b depend upon the identity of the diacid or diacid derivative, polyamine, and endcapping agent. For a prepolymer prepared from adipic acid, diethylenetriamine, and monoethanolanine, a=0.0459 and b=0.325.

SYNTHESIS OF THE RESINS

The prepolymers of Examples 1–15 were used to prepare the resins of Examples 16–30, respectively. The prepolymers of Examples 2 and 9 were used to prepare the resins of Examples 31 and 34, while the Example 10 prepolymer was employed in preparing the resins of both Example 32 and Example 33.

Prepolymer, intralinker, and water were added to a 500 ml. 4-necked flask fitted with a condenser, addition funnel, thermocouple, and mechanical stirrer. The temperature of the mixture was raised to 60° C. and viscosity was monitored using Gardner-Holdt tubes while the temperature was held at this point.

For Examples 16–21, 26–31, and 33, the reaction was conducted as a single step. Specifically, cold dilution water was added to cool the reaction to room temperature when the terminal viscosity was reached.

In the case of Examples 22–25, 32, and 34, the resin was prepared by a multistep dilution procedure. After an initial Gardner-Holdt viscosity of "L" was reached, warm water (about 60° C.) was added, and the reaction was continued until a Gardner-Holdt viscosity of "L" was reached a second time. Warm water was added once more, with the reaction again being continued until a third predetermined viscosity value was reached; for Examples 22–25 and 32, this was the terminal viscosity.

In the case of Example 34, warm water was added yet again, and the reaction was continued until a Gardner-Holdt viscosity of "L" was reached. This fourth viscosity value was the terminal viscosity for Example 34.

At the point of terminal viscosity the reaction was diluted with cold water, and cooled to room temperature. A light gold product was thusly provided.

Table 3 below sets forth the amounts of prepolymer (g/g solids/eq) and intralinker (g/moles) employed in preparing the intralinked polyamidoamines of Examples 16–34. Table 3 also sets forth the solids content, pH, and Brookfield viscosity (in centipoises) of the product, as well as the above-noted Gardner-Holdt reaction points and reduced specific viscosity of the resin.

Further in Table 3, the Max. % intralinker value also denotes the amount of intralinker used in the foregoing Examples; yet additionally, it is the maximum amount of the intralinker which can be reacted with the indicated prepolymer, without causing the resin to gel or resulting in a resin with reactive intralinker functionality. This measurement is accordingly provided as a mole percent of the intralinker, based on the intralinker reactive amine groups in the prepolymer—i.e., it is calculated as the molar percent of the indicated intralinker reactive amine functionality. The resulting value thusly expresses, as a percentage, the relationship of moles of intralinker per mole of intralinker reactive amine groups in the prepolymer.

TABLE 3

Synthesis of Resins

| | | Charge | | | |
|---|---|---|---|---|---|
| Example Number | Prepol Ex. # | Prepolymer; g/g solids/eq[1] | Intralinker; g/moles[2] | Max. % Intralinker | Water (mL) |
| 16 | 1 | 95.98/47.99/0.225  | 1.04/0.01125 epi | 5.0% Epi  | 70  |
| 17 | 2 | 95.41/47.99/0.225  | 4.16/0.045 epi   | 22.8% Epi | 60  |
| 18 | 3 | 91.72/54.76/0.225  | 3.64/0.0394 epi  | 15.1% Epi | 100 |
| 19 | 4 | 131.60/65.41/0.225 | 7.80/0.0843 epi  | 37.5% Epi | 100 |
| 20 | 5 | 140.84/72.68/0.25  | 8.10/0.0875 epi  | 35.0% Epi | 120 |
| 21 | 6 | 150.48/76.59/0.25  | 10.41/0.1125 epi | 42.5% Epi | 115 |

TABLE 3-continued

Synthesis of Resins

| | | | | | |
|---|---|---|---|---|---|
| 22 | 7 | 130.93/67.82/0.25 | 6.94/0.075 epi | 30.0% Epi | 108 |
| 23 | 8 | 133.77/67.82/0.25 | 6.94/0.075 epi | 30.0% Epi | 108 |
| 24 | 9 | 131.69/67.82/0.25 | 7.31/0.079 epi | 31.0% Epi | 108 |
| 25 | 10 | 134.3G/67.82/0.25 | 6.94/0.075 epi | 30.0% Epi | 108 |
| 26 | 11 | 90.52/54.68/0.225 | 4.16/0.045 epi | 30.0% Epi | 100 |
| 27 | 12 | 98.23/49.90/0.50 | 3.47/0.0375 epi | 7.5% Epi | 80 |
| 28 | 13 | 133.27/64.1/0.50 | 5.78/0.0625 epi | 12.5% Epi | 80 |
| 29 | 14 | 117.89/61.18/0.20 | 4.63/0.05 epi | 25.0% Epi | 100 |
| 30 | 15 | 138.31/71.37/0.20 | 7.78/0.084 epi | 42.0% Epi | 115 |
| 31 | 2 | 95.41/47.99/0.225 | 6.87/0.0197 EGG | 8.8% EGD | 60 |
| 32[5] | 10 | 134.3/67.82/0.25 | 11.50/0.0569 BDD | 22.0% BDD | 115 |
| 33 | 10 | 134.30/67.82/0.25 | 14.10/0.055 CHD | 22.0% CND | 115 |
| 34 | 9 | 129.18/67.82/0.252 | 10.62/0.050 BDD | 20.0% BDD | 115 |

| Example Number | Time- min.[3] | Resin G-H | Added Water (ml) | B.V. (cPs) | Resin RSV (dL/g)[4] | pH | Solids |
|---|---|---|---|---|---|---|---|
| 16 | 240 | F | 82 | 23.0 | 0.2114 | 9.42 | 18.4% |
| 17 | 120 | L | 82 | 54.1 | 0.3466 | 8.46 | 20.6% |
| 18 | 128 | L | 150 | 30.6 | 0.3415 | 8.82 | 16.1% |
| 19 | 240 | C | 50 | 23.5 | 0.1239 | 7.50 | 25.8% |
| 20 | 240 | C | 135 | 16.0 | 0.1256 | 7.79 | 19.6% |
| 21 | 470 | D | 120 | 25.0 | 0.1421 | 7.13 | 21.8% |
| 22 | 325/135/155 | L, L, G | 50/75/125 | 54.6 | 0.4738 | 7.92 | 14.6% |
| 23 | 259/49/42 | L, L, L | 50/75/125 | 314 | 0.7183 | 7.9 | 13.5% |
| 24 | 300/65/60 | L, L, L | 50/75/125 | 138 | 0.6416 | 7.98 | 14.5% |
| 25 | 272/58/48 | L, L, L | 50/75/125 | 138 | 0.6990 | 8.12 | 14.2% |
| 26 | 147 | L | 150 | 35.1 | 0.4038 | 8.41 | 16.1% |
| 27 | 240 | G | 30 | 36.1 | 0.2334 | 9.27 | 22.0% |
| 28 | 240 | F | 30 | 53.4 | 0.1825 | 8.51 | 27.5% |
| 29 | 102 | L | 150 | 43.1 | 0.3677 | 9.87 | 17 2% |
| 30 | 470 | C | 150 | 16.6 | 0.1486 | 9.82 | 19.5% |
| 31 | 75 | L | 82 | 73.5 | 0.3218 | 9.52 | 21.9% |
| 32[5] | 37/13/38 | L, L, L | 50/75/125 | 133 | 0.6575 | 9.61 | 14.9% |
| 33 | 519 | F | 250 | 14.0 | 0.1434 | 9.65 | 15.5% |
| 34 | 245/67/16/5 | L, L, L, L | 48/75/75/50 | 174 | 0.7355 | 10.23 | 15.0% |

[1]Grams of prepolymer solution/grains of solid prepolymer/total equivalents of intralinker reactive amine in prepolymer.
[2]Grains intralinker/moles intralinker;
epi = epichlorohydrin;
EGD = ethylene glycol diglycidyl ether;
BDD = 1,4-butanediol diglycidyl ether;
CHD = 1,4-cyctohexanedimethanol diglycidyl ether.
[3]Time for reaction mixture to reach viscosity after temperature reaches 60° C.
[4]Measured at 25° C. in 1.0 M $NH_4Cl$ at a concentration of 2.00 g/dL.
[5]Reaction was run at 50° C. instead of 60° C.

As evidenced in Table 3, the maximum amount of intralinker which can be employed, without causing gelling or resulting in reactive intralinker functionality, increases as the prepolymer molecular weight decreases. In FIG. 3, maximum percent intralinker is plotted as a function of prepolymer molecular weight for Examples 17–26. The resulting plot gives good correlation with the following formula:

$$\text{Max. \% Intralinker} = a[RSV]^b$$

This formula accordingly expresses the relationship between maximum amount of intralinker and prepolymer molecular weight. The values for a and b depend upon the identity of the diacid or diacid derivative, polyamine, end-capping agent, and intralinker. For an intralinked polyamidoamine prepared from adipic acid, diethylenetriamine, monoethanolamine, and epichlorohydrin, a=0.0135 and b=−2.97.

FIG. 4 shows the relationship between maximum amount of intralinker and $1/(DP_n-1)$ for Examples 17–26; the points plotted on the graph are from these Examples, with the Max. % intralinker values having been converted to moles of intralinker per mole of intralinker reactive amine groups in the prepolymer. The resulting curve demonstrates the correspondence between maximum intralinker and $1/(DP_n-1)$.

DETERMINATION OF THERMOSETTABILITY

The relative degree of thermosettability of different dried resin samples was determined by swelling in water; in this context, thermosettability refers to the interconnections between discrete resin molecules, as discussed herein, which characterize gelling and thermosetting. As noted in P. J. Flory, *Principles of Polymer Chemistry*, pp. 576–589, Cornell University Press, Ithaca, N.Y. (1953)—which is incorporated herein in its entirety, by reference thereto—the degree of thermosettability of a material is inversely proportional to its degree of swelling in a good solvent— e.g., water. A nonthermosetting resin will be free, or at least substantially or essentially free, of intermolecular connections between discrete resin molecules, and will dissolve completely in a good solvent.

For instance, in the following procedure the period of time for allowing dissolution of the resins being tested was 24 hours. However, it is understood that the nonthermosetting resins of the invention are not limited to those which dissolve thusly within 24 hours, and therefore include nonthermosetting resins which dissolve completely within time periods greater than 24 hours.

Films were prepared from aqueous solutions of different prior art polyamidoamine-epichlorohydrins, and from an aqueous solution of a resin of the present invention. The films were prepared by drying these solutions in aluminum pans 3" in diameter.

In each instance, an amount of the resin solution having a total solids content of 11.00 g was placed in the pan, which was heated in a Blue M Stabil-Therm forced air oven (Blue M Electrical Company, Blue Island, Ill.) according to the following procedure:

| First Day | 4 hours at 35° C.; |
| | 4 hours at 40° C.; |
| | 16 hours at 45° C.; |
| Second Day | 4 hours at 50° C.; |
| | 4 hours at 60° C.; |
| | 16 hours at 80° C. |

At this point the film sample was cooled to room temperature in a desiccator. The resulting film was about 2.4 mm thick.

A sample of the film weighing between 0.4 and 0.6 g was weighed to 0.0001 g, and was added to 100 mL of deionized water in a bottle. After 24 hours, the contents of the bottle were poured through a tared steel mesh funnel (~50 mm diameter ×50 mm high, 100 mesh monel steel); to ensure that all of the sample had been removed, the bottle was then rinsed with deionized water, which was also poured through the funnel. Excess water was removed from the funnel by patting the underside of the funnel with tissue paper. If a swollen (i.e, with water) sample was thusly obtained, this sample was accordingly collected in the funnel.

The mass of collected material was then measured to 0.0001 g by weighing the funnel, and comparing this result to the mass of the funnel before the bottle contents were poured therethrough. The swelling ratio of collected sample was calculated as the mass of water held by the sample per unit mass of dry sample, according to the following equation:

$$Q=[M-M(O)]/M(O)$$

wherein Q is the swelling ratio, M(O) is the mass of the sample as measured after drying, and M is the mass of the sample as measured after 24 hours in deionized water.

The results of the foregoing testing are listed in Table 4 below. As evidenced in this Table, the prior art resins all became insolubilized upon drying, and exhibited a measurable swelling ratio. The resin of Example 22 herein was completely dissolved in water in 24 hours, and thus did not thermoset upon drying.

TABLE 4

Water Swelling of Polyamidoamine-Epichlorohydrin Resins

| Resin | Weight of Resin Solution | Solids Content of Resin Solution | Swelling Ratio (Q) |
|---|---|---|---|
| Example 22 | 75.34 g | 14.6% | Infinite |
| U.S. Patent 2,926,154; Example 1 | 88.00 g | 12.5% | 5.92 |
| Canadian Patent 979,579; Example 1 | 88.71 g | 12.4% | 13.9 |
| U.S. Patent 5,338,807; Example 1 | 45.27 g | 24.3% | 23.1 |

Finally, although the invention has been described with reference to particular means, materials, and embodiments, it should be noted that the invention is not limited to the particulars disclosed, and extends to all equivalents within the scope of the claims.

What is claimed is:

1. A process for preparing an intralinked polyamidoamine which is nonthermosetting and endcapped, comprising reacting at least one dicarboxylic acid or dicarboxylic acid derivative, at least one polyamine, at least one endcapping agent, and at least one intralinker.

2. The process of claim 1 comprising:
   (a) reacting the at least one dicarboxylic acid or dicarboxylic acid derivative, at least one polyamine, and at least one endcapping agent to form an endcapped polyamidoamine prepolymer; and
   (b) reacting the endcapped polyamidoamine prepolymer with the at least one intralinker.

3. The process of claim 2 wherein:
   (a) the endcapped polyamidoamine prepolymer has a $DP_n$ of about 2 to about 50, is free or substantially free of amine and carboxyl end groups, and comprises:
      (i) alternating dicarboxylic acid and polyamine residues; and
      (ii) endcaps lacking carboxyl and amine functionality; and
   (b) the mole ratio of the at least one intralinker, to intralinker reactive amine groups in the endcapped polyamidoamine prepolymer, is between about $\frac{1}{2}[1/(DP_n-1)]$ and about $1/(DP_n-1)$.

4. The process of claim 3 wherein the at least one endcapping agent comprises at least one member selected from the group consisting of monofunctional amines, monofunctional carboxylic acids, and monofunctional carboxylic acid esters.

5. The process of claim 2 wherein the ratio of total amidization reactive carboxyl groups to total amidization reactive amine groups, of the at least one dicarboxylic acid or dicarboxylic acid derivative, at least one polyamine, and at least one endcapping agent, is about 1:1.

6. The process of claim 5 wherein:
   (a) the ratio of total dicarboxylic acid or dicarboxylic acid derivative amidization reactive carboxyl groups, to total polyamine amidization reactive amine groups, is sufficiently greater than 1:1 so that the endcapped polyamidoamine prepolymer, formed by reacting the at least one dicarboxylic acid or dicarboxylic acid derivative, at least one polyamine, and at least one endcapping agent, has a $DP_n$ of about 2 to about 50;
   (b) the at least one endcapping agent comprises at least one monofunctional amine; and
   (c) the total dicarboxylic acid or dicarboxylic acid derivative amidization reactive carboxyl groups is about equal to the sum of the total polyamine and total endcapping agent amidization reactive amine groups.

7. The process of claim 6 wherein the mole ratio of the at least one intralinker, to intralinker reactive amine groups in the endcapped polyamidoamine prepolymer, is between about 0.02 and 0.5.

8. The process of claim 6 wherein the mole ratio of the at least one intralinker, to intralinker reactive amine groups in the endcapped polyamidoamine prepolymer, is between about $\frac{1}{2}[1/(DP_n-1)]$ and about $1/(DP_n-1)$.

9. The process of claim 8 wherein the endcapped polyamidoamine prepolymer has a $DP_n$ of about 3 to about 25.

10. The process of claim 9 wherein the endcapped polyamidoamine prepolymer has a $DP_n$ of about 3 to about 10.

11. The process of claim 8 wherein:
   (a) the at least one dicarboxylic acid or dicarboxylic acid derivative comprises at least one member selected from the group consisting of dicarboxylic acids;

(b) the at least one polyamine comprises at least one member selected from the group consisting of polyalkylene polyamines having:
  (i) at least two primary amine groups, and
  (ii) at least one member selected from the group consisting of secondary amine groups and tertiary amine groups; and
(c) the at least one intralinker comprises at least one member selected from the group consisting of epichlorohydrin, epibromohydrin, diepoxides, diacrylates, dimethacrylates, diacrylamides, and dimethacrylamides.

12. The process of claim 11 wherein:
(a) the at least one dicarboxylic acid or dicarboxylic acid derivative comprises adipic acid;
(b) the at least one polyamine comprises at least one member selected from the group consisting of diethylenetriamine, triethylenetetramine, tetraethylenepentamine, and N-methyl-bis(aminopropyl)amine; and
(c) the at least one intralinker comprises at least one member selected from the group consisting of epichlorohydrin, ethylene glycol diglycidyl ether, 1,4-butanediol diglycidyl ether, and 1,4-cyclohexanedimethanol diglycidyl ether.

13. The process of claim 12 wherein the endcapping agent comprises monoethanolamine.

14. The process of claim 5 wherein:
(a) the ratio of total polyamine amidization reactive amine groups, to total dicarboxylic acid or dicarboxylic acid derivative amidization reactive carboxyl groups, is sufficiently greater than 1:1 so that the endcapped polyamidoamine prepolymer, formed by reacting the at least one dicarboxylic acid or dicarboxylic acid derivative, at least one polyamine, and at least one endcapping agent, has a $DP_n$ of about 2 to about 50;
(b) the at least one endcapping agent comprises at least one monofunctional carboxylic acid; and
(c) the total polyamine amidization reactive amine groups is about equal to the sum of the total dicarboxylic acid or dicarboxylic acid derivative and total endcapping agent amidization reactive carboxyl groups.

15. The process of claim 14 wherein the mole ratio of the at least one intralinker, to intralinker reactive amine groups in the endcapped polyamidoamine prepolymer, is between about 0.02 and 0.5.

16. The process of claim 14 wherein the mole ratio of the at least one intralinker, to intralinker reactive amine groups in the endcapped polyamidoamine prepolymer, is between about $\frac{1}{2}[1/(DP_n-1)]$ and about $1(DP_n-1)$.

17. The process of claim 16 wherein the endcapped polyamidoamine prepolymer has a $DP_n$ of about 3 to about 25.

18. The process of claim 17 wherein the endcapped polyamidoamine prepolymer has a $DP_n$ of about 3 to about 10.

19. The process of claim 16 wherein:
(a) the at least one dicarboxylic acid or dicarboxylic acid derivative comprises at least one member selected from the group consisting of dicarboxylic acids;
(b) the at least one polyamine comprises at least one member selected from the group consisting of polyalkylene polyamines having:
  (i) at least two primary amine groups, and
  (ii) at least one member selected from the group consisting of secondary amine groups and tertiary amine groups; and
(c) the at least one intralinker comprises at least one member selected from the group consisting of epichlorohydrin, epibromohydrin, diepoxides, diacrylates, dimethacrylates, diacrylamides, and dimethacrylamides.

20. The process of claim 19 wherein:
(a) the at least one dicarboxylic acid or dicarboxylic acid derivative comprises adipic acid;
(b) the at least one polyamine comprises at least one member selected from the group consisting of diethylenetriamine, triethylenetetramine, tetraethylenepentamine, and N-methyl-bis(aminopropyl)amine; and
(c) the at least one intralinker comprises at least one member selected from the group consisting of epichlorohydrin, ethylene glycol diglycidyl ether, 1,4-butanediol diglycidyl ether, and 1,4-cyclohexanedimethanol diglycidyl ether.

* * * * *